(12) United States Patent
Gehring et al.

(10) Patent No.: US 12,397,657 B2
(45) Date of Patent: Aug. 26, 2025

(54) METHOD FOR OPERATING AN ELECTRIC DRIVE SYSTEM

(71) Applicant: CELLCENTRIC GMBH & CO. KG, Kirchheim unter Teck (DE)

(72) Inventors: Ottmar Gehring, Magstadt (DE); Christian Ballarin, Stuttgart (DE); Steffen Maus, Reutlingen (DE)

(73) Assignee: CELLCENTRIC GMBH & CO. KG, Kirchheim unter Teck (DE)

( * ) Notice: Subject to any disclaimer, the term of this patent is extended or adjusted under 35 U.S.C. 154(b) by 292 days.

(21) Appl. No.: 18/004,465

(22) PCT Filed: Jul. 5, 2021

(86) PCT No.: PCT/EP2021/068461
§ 371 (c)(1),
(2) Date: Jan. 6, 2023

(87) PCT Pub. No.: WO2022/008413
PCT Pub. Date: Jan. 13, 2022

(65) Prior Publication Data
US 2024/0092186 A1    Mar. 21, 2024

(30) Foreign Application Priority Data
Jul. 8, 2020    (DE) .................. 10 2020 004 102.7

(51) Int. Cl.
*B60L 15/20*    (2006.01)
*B60L 50/75*    (2019.01)
(Continued)

(52) U.S. Cl.
CPC ........... *B60L 15/2045* (2013.01); *B60L 50/75* (2019.02); *B60L 53/62* (2019.02); *B60L 55/00* (2019.02);
(Continued)

(58) Field of Classification Search
CPC ...... B60L 15/2045; B60L 55/00; B60L 53/40; B60L 50/75; B60L 58/13;
(Continued)

(56) References Cited

U.S. PATENT DOCUMENTS 5,631,532 A    5/1997    Azuma et al.
7,301,302 B2 *  11/2007    Yoshii ...................... B60K 6/48
                                                    429/430
(Continued)

FOREIGN PATENT DOCUMENTS

DE    102017213088    1/2019
EP    3207585    8/2017
(Continued)

OTHER PUBLICATIONS

International Search Report and Written Opinion for International (PCT) Patent Application No. PCT/EP2021/068461, dated Nov. 15, 2021, 16 pages.

(Continued)

*Primary Examiner* — John D Walters
(74) *Attorney, Agent, or Firm* — Sheridan Ross P.C.

(57) ABSTRACT

The invention relates to a method for operating an electric drive system of a motor vehicle with a backup battery and a fuel cell for providing electric drive power. Here, route data is determined and then, based on this route data, consumption data is forecast.

Figure 1:
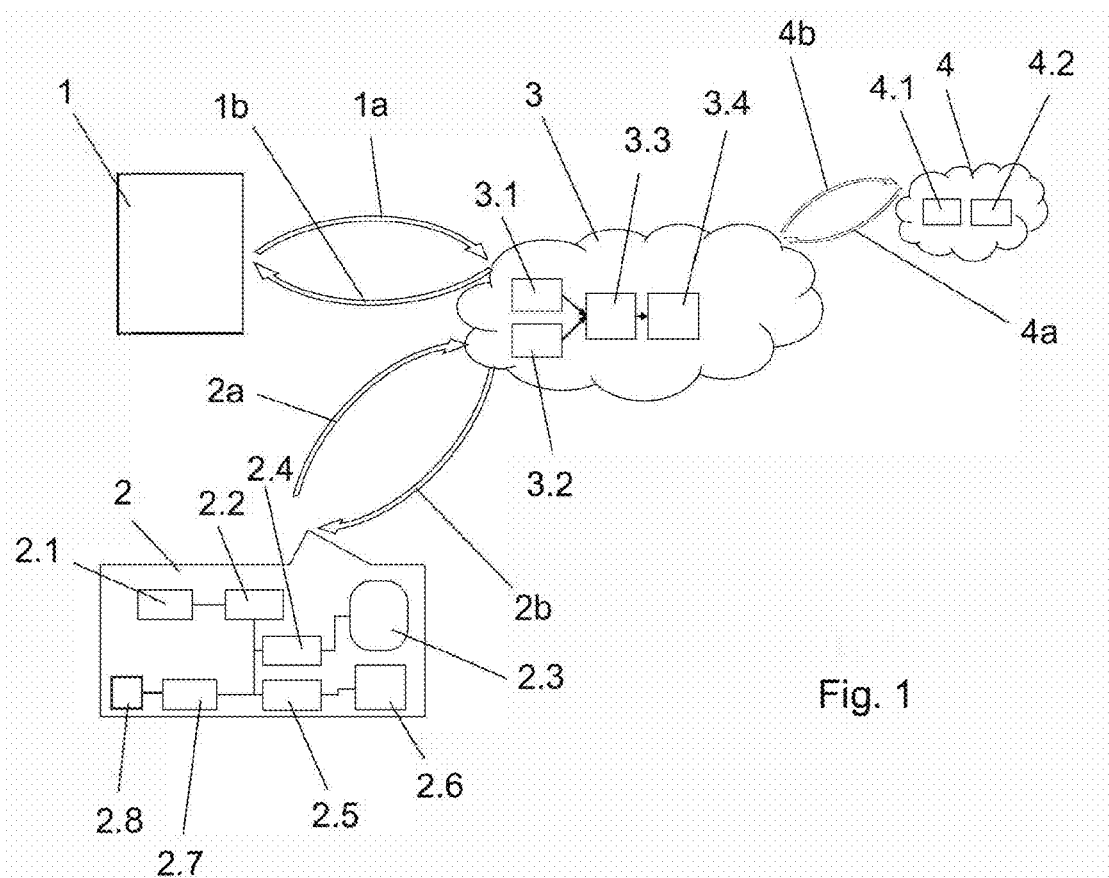

The invention is characterized in that, in order to optimize the operation of the fuel cell based on the forecast consumption data, a total energy demand for the route is forecast, after which a mean fuel cell power is determined which is required together with the energy stored at the starting time of the route in the backup battery to determine the total energy demand over a constant power trajectory for the fuel cell. This is followed by a check as to whether limit values (Continued)

a)

b)

c)

d)

of the backup battery are violated when driving along the route with the power trajectory: if no limit value is violated, the fuel cell is operated with the specified power trajectory; if a limit value is violated, the power of the fuel cell is changed in the area where the limit value is violated and then adjusted to achieve the mean fuel cell power again over the entire route, whereby a new power trajectory is defined. The check is then run through again with the new power trajectory until a power trajectory has been determined without violating the limit values of the backup battery, according to which the fuel cell is then operated.

20 Claims, 1 Drawing Sheet

(51) Int. Cl.
  *B60L 53/62*    (2019.01)
  *B60L 55/00*    (2019.01)
  *B60L 58/13*    (2019.01)
  *B60L 58/40*    (2019.01)
  *H01M 8/04537*   (2016.01)
  *H01M 16/00*    (2006.01)

(52) U.S. Cl.
  CPC ............... *B60L 58/13* (2019.02); *B60L 58/40* (2019.02); *H01M 8/04611* (2013.01); *H01M 8/04626* (2013.01); *H01M 16/006* (2013.01); *B60L 2240/423* (2013.01); *B60L 2240/463* (2013.01); *B60L 2240/642* (2013.01); *B60L 2240/70* (2013.01); *B60L 2260/54* (2013.01); *H01M 2220/20* (2013.01); *H01M 2250/20* (2013.01)

(58) Field of Classification Search
  CPC ......... B60L 2240/423; B60L 2240/463; B60L 2240/642; B60L 2240/70; B60L 2260/54; H01M 8/04611; H01M 8/04626; H01M 16/006
  See application file for complete search history.

(56) References Cited

U.S. PATENT DOCUMENTS

| | | | | |
|---|---|---|---|---|
| 9,837,692 | B2* | 12/2017 | Kawashima | ...... H01M 8/04228 |
| 10,696,165 | B2* | 6/2020 | Bennett | ............ B60L 15/2045 |
| 11,444,301 | B2* | 9/2022 | Chou | ................ H01M 8/04302 |
| 2003/0106726 | A1 | 6/2003 | Yoshi | |
| 2015/0295293 | A1 | 10/2015 | Kawashima et al. | |
| 2015/0298555 | A1 | 10/2015 | Bennett et al. | |
| 2020/0083550 | A1 | 3/2020 | Chou et al. | |

FOREIGN PATENT DOCUMENTS

| | | |
|---|---|---|
| JP | 2007-053051 | 3/2007 |
| JP | 2020-045094 | 3/2020 |
| KR | 10-2003-0017513 | 3/2003 |

OTHER PUBLICATIONS

Official Action with English Translation for Korea Patent Application No. 10-2023-7003317, dated Jun. 17, 2024, 14 pages.

Official Action (no English translation available) for Japan Patent Application No. 2022-580348, dated Dec. 5, 2023, 4 pages.

* cited by examiner

METHOD FOR OPERATING AN ELECTRIC DRIVE SYSTEM

CROSS REFERENCE TO RELATED APPLICATIONS

This application is a national stage application under 35 U.S.C. 371 and claims the benefit of PCT Application No. PCT/EP2021/068461 having an international filing date of 5 Jul. 2021, which designated the United States, and which PCT application claimed the benefit of German Patent Application No. 10 2020 004 102.7 filed 8 Jul. 2020, the contents of each of which are incorporated herein by reference in their entireties.

The invention relates to a method for operating an electric drive system of a motor vehicle, according to the type defined in more detail in the preamble of claim 1.

Electric drive systems for motor vehicles, in particular also for commercial vehicles, with a backup battery and at least one fuel cell, are known from the general prior art. Furthermore, it is known that fuel cells react disadvantageously to very rapid and dynamic changes in fuel cell power with regard to their performance and with respect to their service life. It is therefore also known for such electric drive systems to optimize them in such a way that these problems can be remedied.

In this context, the generic DE 10 2017 213 088 A1 describes a method for operating an electric drive system of a motor vehicle with at least one fuel tank for a fuel cell and at least one traction battery. In this case, navigation data are read in and processed in order to use route information to predict consumption data and thereby define phases for the operation of the fuel cell and phases without operation of the fuel cell. The target of optimization can be an optimization of the overall range, an optimization of the performance, an optimization of the number of refueling stops, or the like, for example.

The object of the present invention consists in further improving such a method.

According to the invention, the object is achieved by a method having the features of the characterizing part of claim 1. Advantageous refinements and developments result from the dependent claims.

Like the method in the generic prior art, the method according to the invention provides that route data is determined, after which consumption data is forecast based on this route data and the operation of the fuel cell is optimized based on this data. The invention now provides that, in order to optimize the operation of the fuel cell, a total energy demand for the planned route be determined, based on the forecast consumption data. Then a mean fuel cell power is determined, which is required to provide this total energy demand together with the energy stored in the backup battery at the starting time, so that the vehicle can cover the route.

Mean fuel cell power, as used herein, or terms used below such as areas and phases which can relate to the trip, are to be understood as mean values relating to respective time units or route units. In essence, these units are dependent on each other, so that it does not play a significant role whether the considerations are made over the distance or over the time required for this distance.

The mean fuel cell power, which is required to cover the entire route together with the energy that may still be stored in the backup battery, is assumed to be a constant mean fuel cell power over the entire route and is set in a respective constant power trajectory for the power required from the fuel cell. The fuel cell is then operated using this trajectory.

After this first constant power trajectory has been defined, a check is then performed to determine whether limit values of the backup battery are violated when covering the route with precisely this power trajectory. Such limit values can be, for example, temperatures that are too high, currents that are too high, a dynamic load on the backup battery that is too high, or the like. According to a particularly advantageous embodiment of the method according to the invention, in particular its state of charge is used as a limit value for the backup battery, possibly in addition to other of the variables mentioned as a limit value. This is also used below for the exemplary description of the method, which, however, is not intended to be limited to just this state of charge.

If the forecast for the route with the fixed power trajectory for the fuel cell, which is constant at the first attempt, does not violate a limit value of the backup battery, then the method is already completed at this point such that operation can take place with this constant power trajectory corresponding to the mean fuel cell power. If, on the other hand, a limit value is violated, the power of the fuel cell is changed by a constant amount in the area, and here again either in the time-related or in the route-related area in which this violation of the limit value occurs. The power is thus increased or decreased, for example. If the limit value is the state of charge of the battery, for example, and this state falls below a critical limit value, the power of the fuel cell would be increased accordingly to have energy to recharge the backup battery and thus prevent the state of charge from falling below the critical limit value.

Since the total power supplied by the fuel cell up to this point in time or location of the route has been increased by increasing the power in this exemplary scenario, the power of the fuel cell is now adjusted in the chronological sequence, reduced in the example just described, in order to provide, on average, the mean fuel cell power again over the entire route. This actually results in a new power trajectory for the power from the fuel cell, which in the example described above would appear in such a way that it first starts constantly at the value of the average fuel cell power, then is temporarily increased in the area where the exemplary limit value of the state of charge is violated, to then continue to run constantly below the previously determined mean fuel cell power.

This new power trajectory is now checked again in the manner described, wherein these steps are repeated until a power trajectory without violation of limit values of the backup battery has been determined, which trajectory is then used to operate the fuel cell. This means that a mean fuel cell power is determined easily and efficiently based on the average energy demand per unit of route or time, or based on the total energy demanded for the entire route and optimized with respect to violation of limit values of the backup battery. This is easy and efficient. It protects the backup battery, since it can cushion critical states determined in advance via the forecast and at the same time the power control of the fuel cell is phlegmatized by this trajectory, such that the fuel cell is operated at constant power as far as possible, which on the one hand benefits its efficiency and on the other hand benefits the service life of the fuel cell.

According to an extraordinarily favorable further development of the method according to the invention, the size of the phase during which the power of the fuel cell is adjusted is greater than the area in which the limit value is violated. The start of the phase is before the onset of the violation. This is possible because the optimization is based on a forecast and therefore does not have to wait until the limit value is actually violated. It can therefore already counteract such a violation of the limit value before it actually occurs in order to prevent it and thus in particular to protect the backup battery and to optimize its service life. Above all, however, a dynamic load on the fuel cell is eliminated. This would be necessary if the violation of the limit value, for example falling below a critical state of charge, would only be "addressed" after it had been measured, in that the fuel cell would then be ramped up very strongly and dynamically with respect to its power. But that would be bad for the fuel cell. By selecting the phase of compensation to be larger than the area of the violation, the magnitude of the power leap required can be reduced. This is also advantageous for the service life and the efficiency of the fuel cell.

Another very advantageous embodiment of the method according to the invention further provides that the power trajectory includes at least one phase with constant power in the respective phase. The power trajectory can therefore consist of a single phase, which is as long as the entire route or the time required for the route, for example in the event that no violation of a limit value of the backup battery is detected during the first check. The trajectory is then accordingly constant at the mean fuel cell power level, such that the fuel cell is continuously operated at steady-state power. In the case of several phases, the power of the individual phases can deviate from one another, but within the respective phase it remains constant to subject the fuel cell to changes of its power as much as possible, which would be very disadvantageous with respect to the service life of the fuel cell.

Another very advantageous embodiment of this method further provides that, in the case of several phases, the transitions between the phases of constant power are specified in the form of ramps and/or curves. In this particularly favorable embodiment of the idea, there is no abrupt change in the power demanded from the fuel cell. Instead, ramps or, if necessary, curves can be specified, which are based in particular on a permitted rate of change in the power of the fuel cell, to further phlegmatize the operation of the fuel cell through "smooth" transitions between the individual phases of constant power and to operate the fuel cell accordingly gently.

An extraordinarily favorable further development of the method according to the invention can further provide that the check takes place from the start of the route to the first violation of a limit value. Thus, the check is performed iteratively by taking place from the start of the route to the first violation of a limit value. The fuel cell power is then adjusted to no longer violate this limit value, which means that if the check is repeated, it starts again at the start and then checks in a route or time diagram quasi from left to right until, if necessary, another limit violation occurs, which then represents the new "first" violation for this check. The power of the fuel cell is then also adjusted again, and, if necessary, this is repeated until no more limit values are violated over the entire route.

According to a very advantageous development of the idea, the method can perform the forecast of the consumption values on the basis of a modeling of the vehicle with a calculation of drive and brake torques along the route. Such modeling of the vehicle, which can be "fed" with respective parameters such as the curb weight, the vehicle load, and other vehicle-specific boundary conditions that remain the same or that change over time, allows a relatively good forecast of the consumption values to improve the operation using the method according to the invention even further.

In principle, the route data can originate from a navigation device of the vehicle, as is the case in the generic prior art mentioned at the outset. However, the method has its particular advantages when the route planning is performed in a very forward-looking manner and over a large route area or period of time and is typically also adhered to relatively strictly. For this purpose, the method can in particular use route data from a vehicle-external server, which can be designed, for example, as part of a navigation system in the cloud or, according to the advantageous variant just described, as a transport management system for logistics planning. Such a logistics planning using a transport management system as it occurs, above all, in the field of transporting goods with commercial vehicles, provides a very long-term and reliable route forecast with stopping points, refueling points, rest periods, and the like. The driver, the moving load, its weight and other vehicle parameters are also stored in the transport management systems typically used, such that the forecast can be made extremely efficiently and reliably. Due to the relatively large period of time over which the route is planned in advance, the method according to the invention also achieves further optimization with respect to the most gentle operation of the fuel cell.

As already mentioned, the state of charge of the backup battery can be used as a limit value. According to an advantageous further development of using the state of charge as a limit value, a starting value of the state of charge of the backup battery, which is required for considering the total energy demand, can be measured accordingly in this case, such that the actual state of charge of the backup battery is used. If it is possible to recharge the backup battery from a stationary power grid, i.e., if the vehicle is a so-called plug-in vehicle, a strategically optimized state of charge can be set before the start by recharging the backup battery or by discharging and feeding electricity back into the power grid. The same applies if recharging takes place on the way from the power grid, for example, when a commercial vehicle is being loaded or unloaded. If there is a downhill stretch after such a charging stop or following the start and the associated charging stop, for example, it can make sense to feed electrical energy back from the battery into the power grid, if, on the other hand, the trip goes uphill, the backup battery can be fully charged whenever possible.

Here, according to a very advantageous development of this idea, the actual state of charge can be checked cyclically, wherein the power trajectory is redetermined for the remaining route if it leaves a tolerance band around the forecast state of charge. This has the advantage that in the event that the power trajectory created using pure modeling and forecast leads to more or less significant deviations during real operation, a respective recalculation or readjustment is possible to optimize the planning again with respect to the energy consumption and the service life of the fuel cell and/or of the backup battery.

In the case of the state of charge, if the limit value in the modeled forecast is exceeded or not reached, the reaction can be such that the area between the forecast curve and the respective limit value is integrated accordingly in order to obtain an energy content, which can then be compensated accordingly by increasing or reducing the power of the fuel cell by a constant value for a corresponding period of time, if possible before the limit value is violated.

The route data within the meaning of the present invention can also include ascents, descents, and other events that are permanently present along the route in addition to the pure route. In addition, the route data can also contain information that can come from third-party providers, for example. This can include weather data, traffic data, data about current construction sites, traffic jams, the forecast of traffic density distributions on the route, and the like, for example.

Further advantageous embodiments of the method according to the invention result from the exemplary embodiment which is described in more detail hereinafter with reference to the figures.

Figure 2:
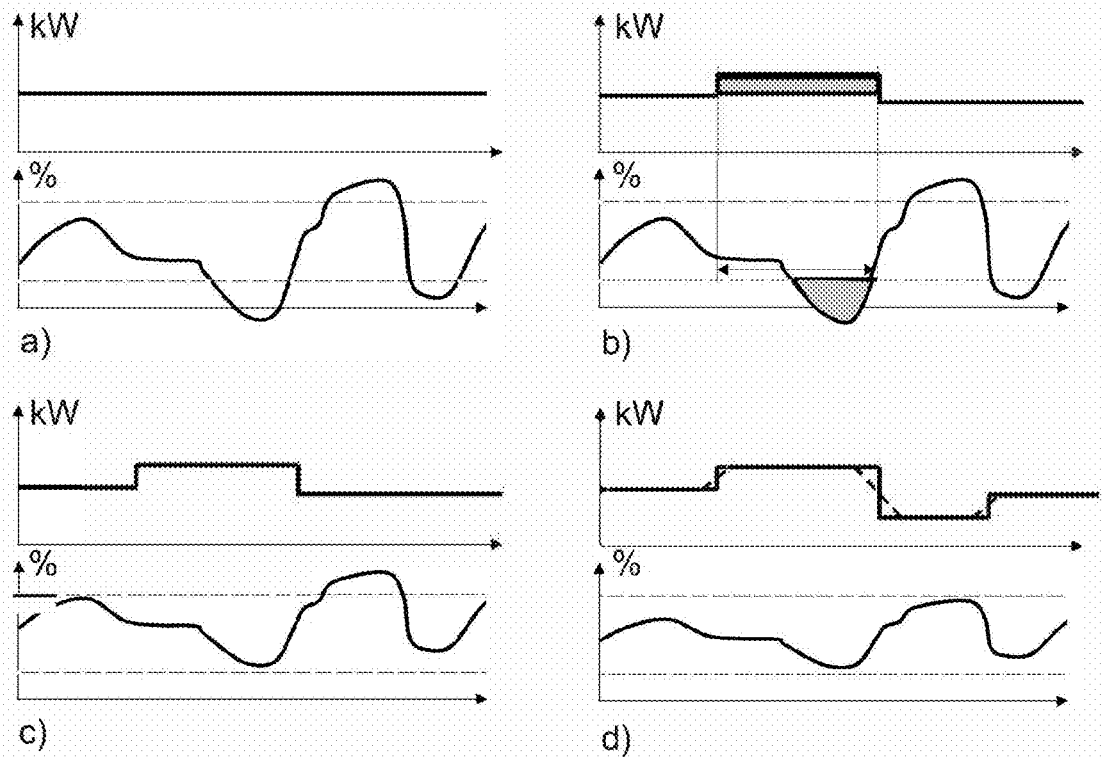

Wherein:

FIG. 1 shows a schematic block diagram of a system with which the method according to the invention can be performed; and FIG. 2 shows various diagrams of the battery state of charge and the desired power value of the fuel cell, which result in an exemplary application of the method according to the invention.

A possible detailed sequence, which includes, among other things, the method according to the invention in a preferred further development, is described below using a schematic block diagram in FIG. 1.

A first step is logistics planning in the box labeled 1 here, which is performed at a fleet operator of a fleet of vehicles, in particular commercial vehicles. In general, this logistics planning 1 is performed in a so-called transport management system (TMS). In this process, transport orders are linked to individual vehicles 2 and their drivers. Furthermore, time and route planning for the respective vehicle 2 is performed. The data package created in this way in logistics planning 1 typically contains the route data, that is, the coordinates of the individual sections, a schedule with departure times, loading and unloading times, break times, and the like. In addition, information about the vehicle 2, for example various vehicle parameters, its equipment, its vehicle identification number, and the like, is stored in the data packet. The data packet also contains data on the driver and on the load of the vehicle, and here in particular on its weight.

This data packet can be transmitted via the communication labeled 1*a* to a driving strategy module 3 and received there via a data interface 3.1. It is then further processed in a driving prediction module 3.3. Matching the information about vehicle 2 from the data packet transmitted using the communication 1*a*, data about the vehicle 2 is requested using communication 2*a*/2*b* via a further interface module 3.2 or read out using a communication module 2.1 of the vehicle 2. These include, for example, physical measured values of the tank 2.3, such as pressure, temperature, and capacity, which are recorded by a tank control module 2.4, and the state of charge of a backup battery 2.8 and, for example, its thermal load, which can come from a battery management module 2.7. Using the logistics planning data and the vehicle data, the driving prediction module 3.3 of the driving strategy module 3 then calculates the energy demand and other vehicle states along the planned route with the planned vehicle.

Here, the influences of traffic, if necessary, of the driver, the topography, the weather, and the traffic infrastructure are also taken into account accordingly. This information can be requested as data packets via the path 4*b* from additional modules 4, for example in the form of weather information 4.1 and/or traffic information 4.2, and/or it can be accessed via path 4*a*.

An operating strategy module 3.4 can use the calculated results of the driving prediction module 3.3 to determine an optimized power demand for a fuel cell 2.6.

The process described below is used for this. Based on the route data already determined from logistics planning 1, the necessary drive and brake torques for the entire route are now calculated using a vehicle model into which the vehicle data of vehicle 2 are fed in. These are then converted into a power demand or into a recuperation power at the electric drive unit. From this, an average power demand related to the respective route section or the respective time unit can be calculated for the entire route. There is therefore an on average constant value of the power demand over the entire route. A mean power to be supplied by the fuel cell 2.8 can then be calculated based on the energy in the backup battery 2.6 and this mean power demand or the total energy demand along the route. As a starting value for the state of charge of the backup battery 2.8, either the actual value that has been recorded via the battery management module 2.7 can be used or, if there is an option of connecting the vehicle 2 or its backup battery 2.8 to a power grid, an optimal starting value for the state of charge (SOC) of the backup battery 2.8 can be set by charging the backup battery 2.8 or feeding back energy from the backup battery 2.8 into the grid.

Based on the modeling already described above, with an assumed mean fuel cell power which remains constant over the entire route, it is checked whether limit values of the state of charge of the backup battery 2.8 are exceeded with such a power trajectory of the fuel cell 2.6 or not. In FIG. 2*a*), the desired power value of the fuel cell 2.6 is shown in kilowatts at the top and the state of charge of the backup battery 2.8 is shown in percentage at the bottom. In this case, two limit values of a lower state of charge not to be undershot and an upper state of charge not to be exceeded are drawn in with a dashed line. The power trajectory of the fuel cell 2.6 is shown as a constant value corresponding to the mean power required by the fuel cell 2.6. The check for a violation of a limit value of the backup battery 2.8 can supplement or, alternatively, take into account other values in addition to the state of charge, for example, temperatures, current intensities, current densities, or the like.

If no violation of the limit values of the backup battery 2.8 is detected at the constant mean power value of the fuel cell 2.6 as the power trajectory, the strategic planning is already complete and the fuel cell 2.6 is operated with this mean value, i.e., a constant power trajectory.

If, as in the illustration in FIG. 2*a*), the charge falls below the minimum state of charge, an appropriate response is required. The check always takes place from left to right in the diagrams in FIG. 2 and respectively begins again at the starting time or starting point of the route until a respective falling below or exceeding of a limit value occurs. In this case, the charge level of the backup battery 2.8 falls below the minimum level, which can be seen accordingly in FIGS. 2*a* and 2*b*. To counteract this shortfall, the gray area under the lower limit value, i.e., an amount of energy, is identified, for example by integrating the area between the curve and the limit value. This value then corresponds to an amount of energy that must additionally be provided by the fuel cell 2.6. In the illustration of FIG. 2*b*), this is brought about by increasing the power of the fuel cell 2.6, namely by the amount of energy previously identified as being below the limit of the backup battery 2.8. To keep the change in power of the fuel cell on the one hand as low as possible and to remain in operation of the fuel cell 2.6 for as long as possible at a constant power, the time or route section during which the power is increased accordingly is enlarged, e.g., doubled, compared to the time or route section during which power had fallen below the lower limit value, as can be seen from the illustration in FIG. 2*b*). To ultimately comply with the mean total power of the fuel cell 2.6 and thus the total energy generated by the fuel cell 2.6 over the route, the curve of the fuel cell power is then reduced accordingly, once again in relation to time or route, such that on average the same mean power as in FIG. 2a is again achieved.

In this way, a new power trajectory for the operation of the fuel cell 2.6 has now emerged. This, too, is then subjected to a renewed check, which is shown analogously to the illustration in FIGS. 2a) in 2c). The check now runs without violating the lower limit value at the state of charge of the backup battery 2.8 until it exceeds the upper limit value of its charge accordingly. The reaction here is analogous, in that the power provided by the fuel cell 2.6 is reduced, at least for the period during which the upper limit value was exceeded. This is shown accordingly in the representation of FIG. 2d). Here, too, a new power trajectory is created for the fuel cell 2.6 with a correspondingly adapted power in the last section shown here, to add up to the mean power and thus the total energy from the fuel cell 2.6 for the route that was determined at the beginning. Based on the performance trajectory, which is shown in FIG. 2d), a renewed check no longer results in violations of limit values of the backup battery 2.8, such that the optimal operating strategy has been found in which the limit values of the backup battery 2.8 are within the permissible limits.

As shown in the illustration of FIG. 2d), the power trajectory for the fuel cell 2.6 now consists of different phases with different power levels of the fuel cell 2.6, wherein the power remains constant within each of the phases, however. This enables a very gentle operation of the fuel cell 2.6. This can be further improved by optionally using ramps or, if necessary, other curves instead of a sudden change in power, as shown here with a solid line, which are based on the maximum possible rate of change that can be used for the fuel cell 2.6 without a loss of service life and performance. In the representation of FIG. 2d), these ramps are shown as dashed lines in the power trajectory.

If an optimal operating strategy in the form of a power trajectory for the fuel cell 2.6 over the entire planned route and an associated curve of the state of charge of the backup battery 2.8 which does not violate any limit values, has now been determined in the operating strategy module 3.4, then this data, after the calculation, which, as shown here, can preferably take place in a cloud, is displayed to the fleet operator or dispatcher in the logistics planning 1 on the path designated 1b and at the same time transmitted to the vehicle 2 on the path designated 2b. As an alternative to this, instead of the calculation performed in the driving strategy module 3 in the cloud, this calculation could also take place completely in the vehicle, which does not affect the method described any further, but only changes the communication paths in a manner that is self-evident to a person skilled in the art.

The calculated operating strategy is then forwarded in the form of a location- or time-dependent desired power value for the fuel cell 2.6, i.e., its power trajectory and an assumed precalculated curve of the state of charge of the backup battery 2.8 via the communication module 2.1 to a central drive control module 2.2 of the vehicle 2, which then implements the operating strategy in the vehicle 2 accordingly.

Here, the drive control module 2.2 uses the precalculated power trajectory for the fuel cell 2.6 to specify target values in the vehicle 2 via the control module 2.5 of the fuel cell 2.6. At the same time, the drive control module 2.2 checks whether there are any deviations between the planned curve of the state of charge of the backup battery 2.8 and the real curve during the trip, which can be called up from the battery management module 2.7. If there are deviations between the planned and the real curves of the state of charge of the backup battery 2.8 or if thermal load limits, current limits, current density limits, or the like are reached, then the drive control module 2.2 can make corrections in the power demand for the fuel cell 2.6. This can also remain unnoticed up to a certain predefined threshold or a tolerance band around the calculated planned state of charge. However, if such a tolerance band is exceeded, it can make sense if the further calculation is not only performed in the vehicle 2, but is also reflected back to the corresponding driving strategy module 3 to perform the planning process described above again for the remainder of the route ahead and thus to optimize the planning, even if deviations occurred on the way, for example, due to unforeseeable external events such as a sudden traffic jam due to an accident, an unplanned deviation from the route due to a short-term detour, or the like.

If a deviation from the route selection by the driver of the vehicle 2 is detected, a respective replanning can also be initiated, which can then take place in the manner described above and the result of which can be distributed to the systems 1, 2 involved. As part of this, route data can also be updated, in particular with additional information, such as updated traffic data, traffic flow data, weather information, or the like.

The invention claimed is:

1. A method for operating an electric drive system of a motor vehicle, which comprises at least one backup battery and at least one fuel cell for providing electric drive power, wherein route data is determined and then, based on this route data, consumption data is forecast to optimize the operation of the fuel cell,
   characterized in that, to optimize the operation of the fuel cell based on the forecast consumption data, a total energy demand for the route is forecast, after which a mean fuel cell power is determined, which is required to provide the total energy demand together with the energy stored in the backup battery at the starting time of the route,
   whereby a constant power trajectory for the power required for this from the fuel cell is defined, after which a check is performed to determine whether limit values of the backup battery are violated during traveling the route using the power trajectory:
   if no limit value is violated, the fuel cell is operated with the defined power trajectory;
   if a limit value is violated, the power of the fuel cell is changed in the area where the limit value is violated by an amount that remains constant over time, and then adjusted in order to achieve the mean fuel cell power again over the entire route, whereby a new power trajectory is defined, after which
   the check is run through again with the new power trajectory until a power trajectory without violation of limit values of the backup battery has been determined, according to which the fuel cell is then operated.

2. The method according to claim 1,
   wherein
   the size of the phase during which the power of the fuel cell is adjusted, is specified greater than the area of violation of the limit value, wherein the start of the phase lies before the start of the violation.

3. The method according to claim 2,
   wherein
   the power trajectory comprises at least one phase with constant power in the respective phase.

4. The method according to claim 2,
   wherein the check takes place from the start of the route to the first violation of a limit value, respectively.

5. The method according to claim 2,
wherein
the consumption values are forecast based on a modeling of the motor vehicle with a calculation of drive and brake torques on the route.

6. The method according to claim 2,
wherein
the route data is queried by a vehicle-external server, in particular from a transport management system of a logistics planning unit.

7. The method according to claim 2,
wherein
the state of charge of the backup battery is used as the limit value.

8. The method according to claim 1,
wherein
the power trajectory comprises at least one phase with constant power in the respective phase.

9. The method according to claim 8,
wherein
in the case of several phases, the transitions between the phases of constant power are specified in the form of ramps and/or curves.

10. The method according to claim 8,
wherein
the check takes place from the start of the route to the first violation of a limit value, respectively.

11. The method according to claim 8,
wherein
the consumption values are forecast based on a modeling of the motor vehicle with a calculation of drive and brake torques on the route.

12. The method according to claim 8,
wherein
the route data is queried by a vehicle-external server, in particular from a transport management system of a logistics planning unit.

13. The method according to claim 8,
wherein
the state of charge of the backup battery is used as the limit value.

14. The method according to claim 1,
wherein
the check takes place from the start of the route to the first violation of a limit value, respectively.

15. The method according to claim 1,
wherein
the consumption values are forecast based on a modeling of the motor vehicle with a calculation of drive and brake torques on the route.

16. The method according to claim 1,
wherein
the route data is queried by a vehicle-external server, in particular from a transport management system of a logistics planning unit.

17. The method according to claim 1,
wherein
the state of charge of the backup battery is used as the limit value.

18. The method according to claim 17,
wherein
the actual state of charge of the backup battery or, in the case of an option of recharging the backup battery from a stationary power grid, a strategically optimized state of charge is used as the starting value of the state of charge, which is then set by charging/discharging on the power grid before starting.

19. The method according to claim 18,
wherein
the actual state of charge is checked cyclically, wherein the power trajectory for the remaining route is redetermined in the event that this leaves a tolerance band around the forecast state of charge.

20. The method according to claim 17,
wherein
the actual state of charge is checked cyclically, wherein the power trajectory for the remaining route is redetermined in the event that this leaves a tolerance band around the forecast state of charge.

* * * * *